United States Patent [19]
Moretz

[11] Patent Number: 5,947,852
[45] Date of Patent: Sep. 7, 1999

[54] SPROCKET OR GEAR WITH METAL HUB

[75] Inventor: Ralph D. Moretz, Jackson, Mich.

[73] Assignee: TMJ Properties, L.L.C., Jackson, Mich.

[21] Appl. No.: 09/080,387

[22] Filed: May 18, 1998

[51] Int. Cl.$^6$ .................................................. F16H 55/06
[52] U.S. Cl. ............................ 474/161; 474/160; 74/434
[58] Field of Search .................................... 474/152, 160, 474/903, 902, 161; 74/434, 439, DIG. 10

[56] References Cited

U.S. PATENT DOCUMENTS

| | | | |
|---|---|---|---|
| 4,078,445 | 3/1978 | Kiser, Jr. | 474/161 X |
| 4,106,357 | 8/1978 | Segawa | 474/160 |
| 4,144,773 | 3/1979 | Addicks | 474/161 |
| 4,416,650 | 11/1983 | Wilkins | 474/161 |
| 4,453,924 | 6/1984 | Sugino | 474/161 X |
| 4,760,752 | 8/1988 | Wield et al. | 74/434 |

*Primary Examiner*—Tamara L. Graysay
*Assistant Examiner*—Marcus Charles
*Attorney, Agent, or Firm*—Young & Basile, P.C.

[57] ABSTRACT

A rotary polymeric torque transfer device such as a vehicle timing chain sprocket wherein the sprocket comprises a polymeric body having homogeneous teeth and torque is transferred to the body by a metal non-insert drive member which includes an inner portion defining a hub, a central portion for receiving fasteners for mounting the sprocket upon shaft support structure, and the drive member outer portion includes torque drive elements cooperating with shoulders defined on the polymeric body radially spaced from the body axis of rotation whereby the transfer of torque between the drive member and the polymeric body occurs adjacent the body periphery radially spaced from the rotation axis to increase the length of the moment arm and reduce the torque forces transmitted between the drive member and the polymeric body to prevent excessive stress and wear between these components.

12 Claims, 3 Drawing Sheets

SPROCKET OR GEAR WITH METAL HUB

BACKGROUND OF THE INVENTION

1. Field of the Invention

The invention pertains to polymeric torque transfer devices such as chain sprockets or gears for transferring torque from one shaft to another wherein the body and the teeth of the device defined on the periphery thereof are formed of a polymeric material.

2. Description of the Related Art

Chain sprockets for association with roller and segmented chains, or gears with meshing gear teeth, are commonly employed to transfer torque between rotating shafts. By varying the diameters of the sprockets or gears, the ratios of rotation between such interconnected torque transfer devices can be regulated. Typically, the sprockets or gears are formed of metal and may be stamped, machined, or molded of powdered metal, and as the chain or gear teeth are also formed of metal, considerable noise and wear exists between the rotating sprocket or gear, and the chain or teeth.

In order to reduce costs, and reduce noise and wear, chain sprockets, and gears, have been formed of polymeric materials such as nylon or the like, and upon using a polymeric material having self-lubricating characteristics, costs, weight, noise and wear can be reduced. However, because of the relatively "soft" characteristic of polymeric materials, polymeric sprockets and gears formed solely of a polymeric composition can only be used in light duty applications as the material is not capable of transmitting higher torques without experiencing excessive stress and damage. Higher torques cannot be transferred by conventional polymeric devices as occurs in automotive timing chains such as used with engine camshafts, chain drive gear systems, motorcycle and bicycle chain drives, agricultural and industrial drives and gear transmissions without some means to remove concentrated stresses at the hub.

In order to accept the hub stresses in polymeric sprockets and gears, such devices are usually molded over a metal insert hub. Such inserts are used in the hub of the polymeric device to increase the strength and torque transfer capabilities of the device decreasing the probability of long-term deformation and loss of function. However, when an insert is molded into a polymeric sprocket or gear, the polymeric material shrinks during cooling producing high gripping forces adjacent the insert. While such shrinkage of the polymeric material tends to grip the insert strongly, it leaves considerable residual stress in the polymeric material and this stress, over time, often results in failure of the polymeric material due to the presence of such stress points. Further, as polymeric material shrinks at a higher rate of displacement than the metal insert, this difference of coefficient of expansion of the polymeric material and the metal insert changes the mechanical bonding relationship between the metal and non-metal components often resulting in cracking of the polymeric material around the metal insert producing failure of the device.

Accordingly, because of the differences of coefficient of thermal expansion, and the producing of stress points adjacent the insert, torque transfer devices formed of polymeric material utilizing metal inserts have not been suitable in the effective transfer of torque through polymeric sprockets and gears wherein the torque requirements are relatively high, especially in applications where temperature extremes occur.

OBJECTS OF THE INVENTION

It is an object of the invention to provide a polymeric torque transfer device having a polymeric body and teeth which achieves long wearability and function by the use of a metal drive member which is not molded or otherwise inserted into the polymeric body material and engages the polymeric body in such a manner as to effectively transfer torque without producing undue polymeric body stress.

Another object of the invention is to provide a polymeric torque transfer body mechanically associated with a metal drive member in such a manner as to widely separate stress points and radially locate the application of torque forces between the body and drive member to reduce such forces by maximizing the torque moment arm existing between the polymeric body and the drive member.

Yet another object of the invention is to provide a polymeric torque transfer device of light weight and economical construction having a metal drive member wherein radial shoulders are defined on the polymeric body significantly radially spaced from the body axis of rotation wherein the use of a drive member transfers torque to such body shoulders without producing high stress locations likely to cause failure in the body.

A further object of the invention is to provide a polymeric torque transfer sprocket capable of transferring higher torques than most polymeric sprocket constructions, which is of a lower cost than steel sprockets, less weight than comparable steel sprockets, is not as likely to fail as sprockets of polymeric material molded over metal inserts, and which produces less noise and presents a self-lubricating surface at the teeth of the device.

SUMMARY OF THE INVENTION.

In the following summary, and the remainder of the specification, the torque transfer device utilizing the concepts of the invention will be referred to as a chain sprocket. However, it is to be understood that the principles of the invention can be used with any torque transfer device such as a gear or belt pulley which has a circular periphery having torque transfer elements defined thereon such as gear teeth or belt engaging flanges.

Also, in order to draw a clear distinction between an "insert" as often used with polymeric devices wherein the insert, usually of metal, is molded in the polymeric body during the forming thereof by surrounding the insert with the polymeric material of the device, the drive member of the invention is sometimes referred to as an "outsert" to emphasize the distinction between an "insert". The drive member is properly described as an "outsert" as the drive member is not molded into the polymeric material but is only bolted thereto or mechanically engages the polymeric composition without being surrounded thereby. The "outsert" drive member can be separated from the polymeric material without damage thereto by merely removing fasteners.

The basic component of a rotary polymeric torque transfer device in accord with the invention is the polymeric sprocket which comprises a relatively thin plate-like circular body having flat parallel sides, a central opening defining an axis of rotation, and a circular periphery upon which the sprocket teeth for engaging a chain are defined. The body is of a molded polymeric construction including a plurality of circular holes defined through the sides and, in the disclosed embodiment, three of these holes are of an oblong configuration having parallel sides. These oblong holes are located at a 120° spacing from each other about the axis of rotation and are located close to the sprocket periphery radially spaced a maximum distance from the axis of rotation.

The body drive member or outsert is preferably stamped from sheet steel, but could be cast of a castable metal such as zinc or aluminum, and includes an inner portion, a central portion and an outer portion. The central portion defines a generally cylindrical hub having an axis extending at right angles to the plane of the drive member and keys defined in the hub enter notches formed in the body opening. The inner diameter of the hub is only slightly larger than shaft structure for this sprocket which extends therethrough, and the hub determines the axis of rotation of the assembled sprocket.

The central region of the drive member is of a flat configuration having several holes defined therein for receiving threaded bolts which extend through the drive member and through aligned holes defined in the central region of the polymeric body. Also, a dowel receiving alignment hole may be defined in the drive member central region and receives a dowel pressed within a hole in the body. The dowel accurately positions the drive member on the polymeric body prior to the fasteners extending through the drive member being tightened.

The outer portion of the drive member constitutes a plurality of radially extending arms projecting from the central portion and each of these arms is provided with an end. The ends of the arms, three arms being shown in the illustrated embodiment, are homogeneously formed by bending or casting of the end material of the arms into U-shaped projections which are closely received within the oblong openings defined in the body. The linear edges of the oblong body holes form shoulders which are engaged by the U-shaped or oblong projections of the drive member whereby torque forces are transferred between the drive member and the polymeric body.

When installing the sprocket upon its associated shaft structure, the shaft will extend through the drive member hub until the side of the sprocket body opposite to the side against which the drive member bears engages the shoulder of the sprocket shaft structure. Threaded holes in the shaft structure shoulder receive bolts threaded through the openings in the drive member central portion and tightening of these bolts maintains the end projections of the drive member in the body oblong holes and forces the drive member against the body member side in a frictional relationship.

Tightening of the mounting bolts also maintains the ends of the drive member arms within the associated body oblong holes and the U-shaped configuration of the projections are closely received within the oblong holes, the outer sides of the U-shaped projections being closely disposed to the linear portion of the oblong holes which defines engagement of the projection flat surfaces with the hole flat shoulders distributing the torque forces between the drive member and the polymeric body over a significant area. This significant area through which the torque forces pass prevents extensive wear between the drive member and deformation of the polymeric body. Further, deformation is reduced because the drive member projections are located a substantial distance from the axis of rotation of the sprocket producing a relatively long moment arm reducing the force and stress imposed upon the sprocket polymeric material. Accordingly, as the torque forces transferred between the drive member and sprocket body are minimized, stresses imposed upon the components are reduced minimizing the likelihood of fractures and failures, and the drive member outsert, even though it is of a different material than the polymeric sprocket body, is capable of expanding or contracting under thermal changes without stressing the material of the polymeric body due to clearances between the drive member and its projection and the oblong holes of the body.

BRIEF DESCRIPTION OF THE DRAWINGS

The aforementioned objects and advantages of the invention will be appreciated from the following description and accompanying drawings wherein.

Figure 1:
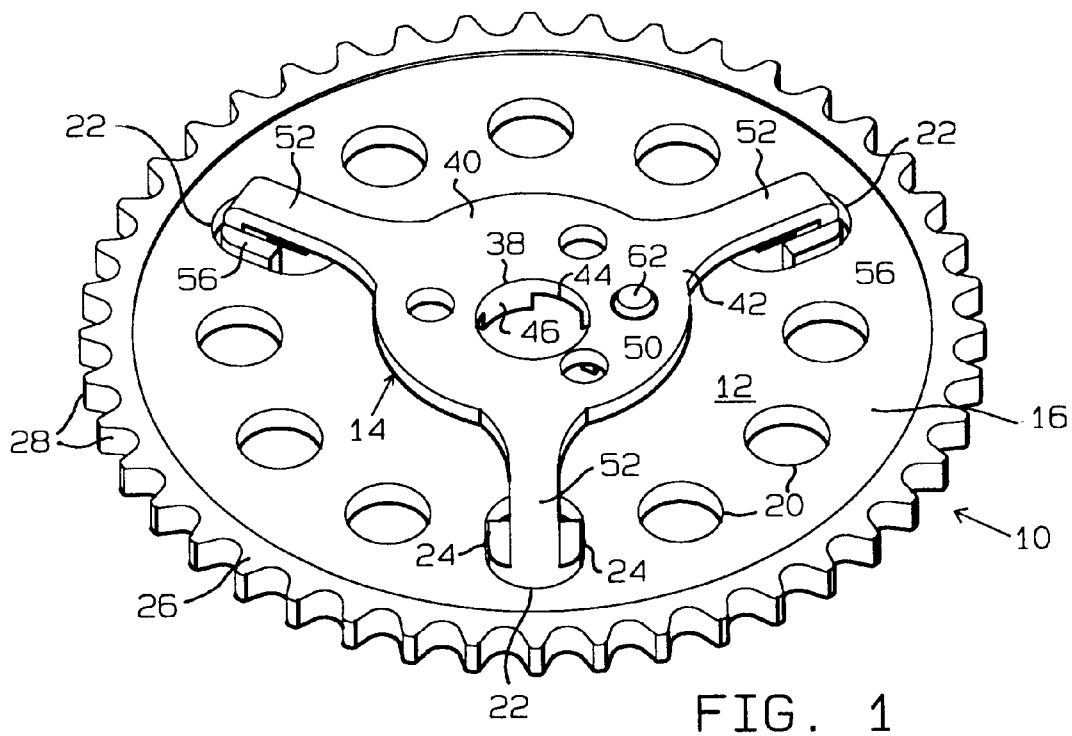
FIG. 1 is a perspective view of a rotary polymeric sprocket or gear in accord with the invention, the drive member being mounted thereon, the fasteners being omitted for purpose of illustration.

DESCRIPTION OF THE PREFERRED EMBODIMENT.

As previously discussed, the inventive concepts may be used with polymeric chain sprockets, gears and flange pulley type torque transfer devices, and for purpose of illustration, a chain sprocket is illustrated in the drawings.

With reference to FIG. 1, a chain sprocket 10 utilizing the concepts of the invention is illustrated. The sprocket consists of two parts, a polymeric molded body 12 and a preferably steel, aluminum, magnesium or zinc drive member or outsert 14 which transfers torque from the shaft structure upon which the sprocket is mounted to the sprocket body 12. The body 12 includes flat parallel spaced sides 16 and 18 having a plurality of circular holes 20 which reduce the weight of the sprocket.

In the disclosed embodiment, three oblong holes 22 are formed in the polymeric body 12 and these holes include parallel spaced linear sides 24 which form shoulders for cooperation with the drive member as later described. Also, the body 12 includes a periphery 26 of slightly greater axial width than the spacing between the sides 16 and 18, and homogeneous teeth 28 are evenly spaced on the periphery 26. In a sprocket, the teeth 28 are shaped to receive a chain, while in a gear, the teeth 28 will be shaped to mesh with other gear teeth.

Figure 7:
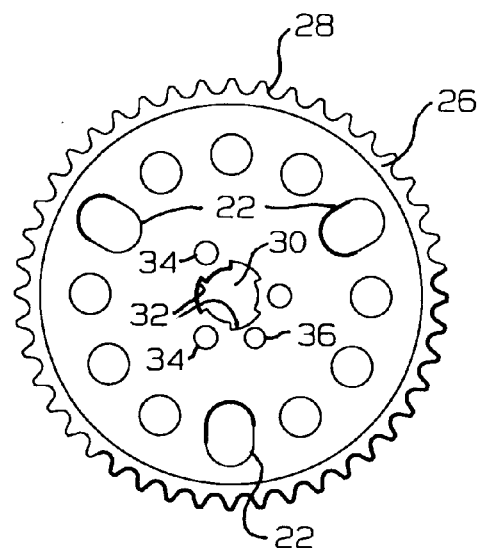
FIG. 7 is a plan perspective view of the sprocket polymeric body, per se.
Figure 8:
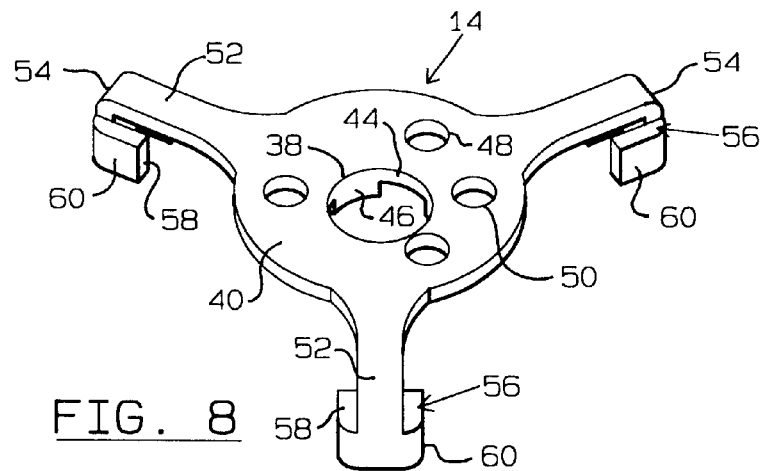
FIG. 8 is a perspective view of the drive member outsert, per se.
Figure 9:
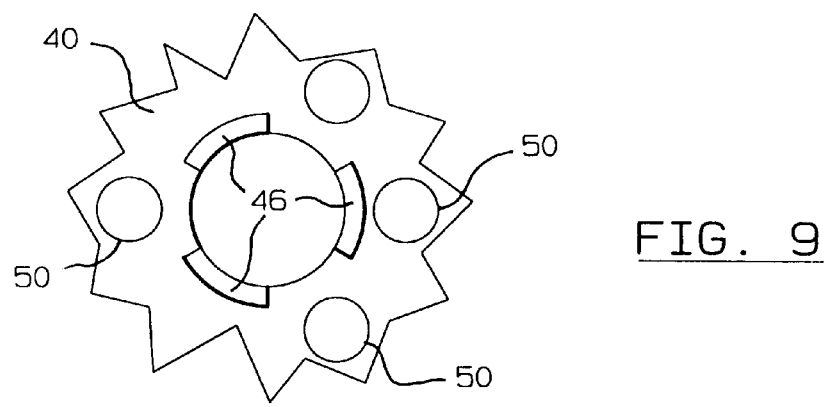
FIG. 9 is an enlarged plan perspective view of the central opening defined in the sprocket body member.
Figure 10:
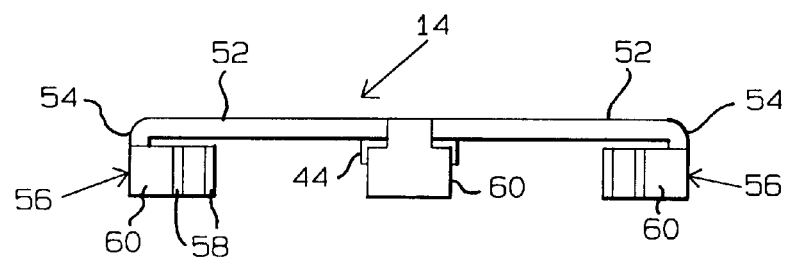
FIG. 10 is a side elevational view of the drive member of FIG. 8.

Centrally, the body 12 is provided with an opening 30, best shown in FIG. 7, having notches 32 intersecting the opening for receiving keys defined in the drive member as later described. Three fastener holes 34 are formed in the sprocket body for receiving threaded fasteners, and a dowel receiving hole 36 is also defined in the body 12.

The drive member 14 is preferably stamped of sheet steel and includes an inner portion 38, a central portion 40 and an outer portion 42. The inner portion 38 forms a generally cylindrical hub 44 which is closely received within the polymeric body opening 30. Axially extending keys 46 are defined on the hub 44 and are of such configuration as to be received within the body opening notches 32 and aid in angularly relating the drive member 14 to the body 12.

The drive member central portion 40 is flat and generally circular in configuration, and three fastener holes 48 are defined therethrough equally spaced from the center of the hub 44. Also, a dowel hole 50 is defined in the central portion 40 for alignment with the dowel hole 36.

Figure 6:
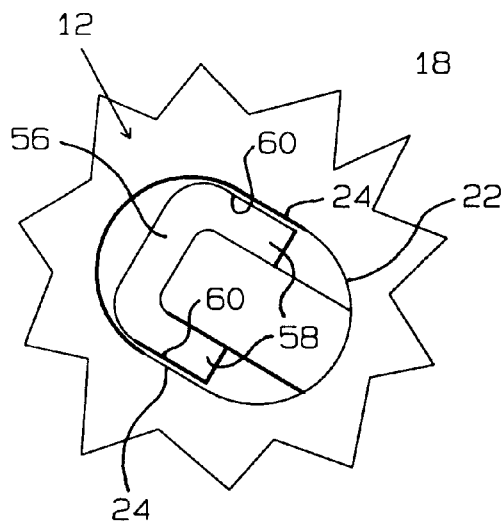
FIG. 6 is an enlarged detail plan view of the drive member projection as received within a body oblong hole.

The outer portion 42 of the drive member, in the disclosed embodiment, consists of three radially extending arms 52 disposed at a 120° relationship to the adjacent arm and each of the arms 52 includes an end 54. Each end 54 includes a U-shaped projection 56 which axially extends from the plane of the arms 52 and central portion 40 in the same direction as the hub 44. By bending procedures, each of the arm ends 54 includes a U-shaped projection 56 which includes legs 58 which define parallel spaced outer sides 60 which are flat, FIG. 6. The spacing between the outer sides 60 of a common projection 56 is only slight less than the spacing between the sides 24 of the body oblong holes 22, and in this manner, the U-shaped projections 56 are each received within an oblong hole 22 in a relatively snug relationship with slight clearances existing to accommodate thermal dimensional changes between the drive member and the polymeric body.

Figure 2:
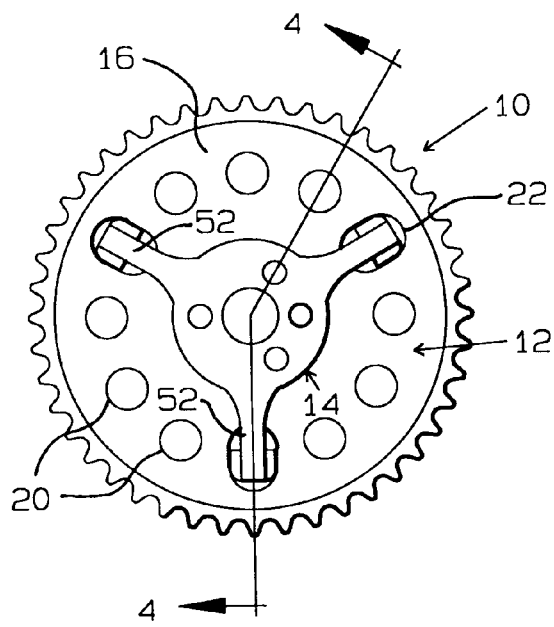
FIG. 2 is a plan view of the sprocket side showing the drive member positioned thereon.
Figure 3:
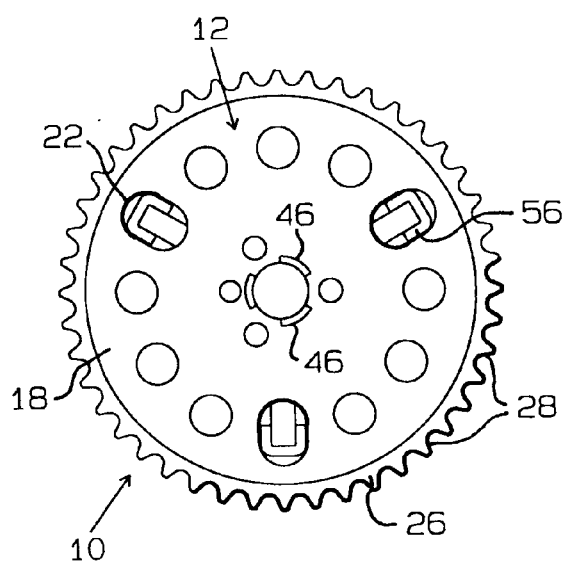
FIG. 3 is a view of the opposite side of the sprocket, the drive member being in the position shown in FIG. 2.

The drive member or outsert 14 is assembled to the body 12 in the manner shown in FIGS. 1–3. Prior to assembly of the body 12 and drive member 14, a dowel 62 will be placed within the dowel hole 36. However, it will be understood that the body 12 may be initially molded with a dowel projection at the site of dowel hole 36 rather than using a separate dowel.

Figure 4:
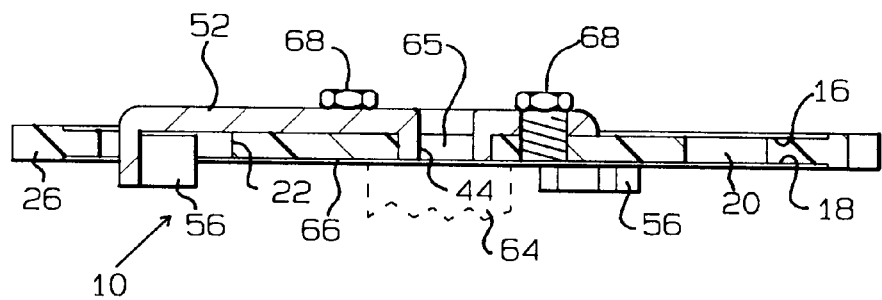
FIG. 4 is an elevational sectional view taken along Section 4—4 of FIG. 2.
Figure 5:
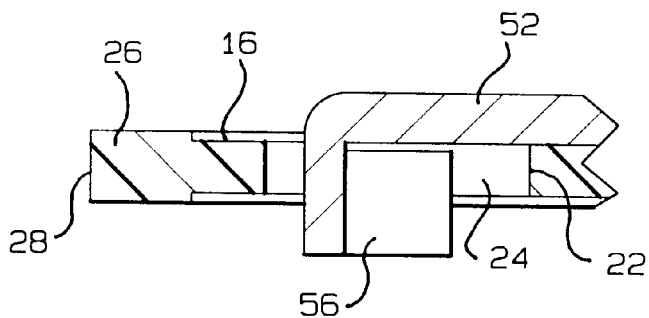
FIG. 5 is an enlarged elevational view illustrating a drive member projection received within a body oblong hole.

When assembling the drive member 14 to the body 12, the drive member will be placed upon the body side 16 so that the dowel 62 will be received within dowel hole 50. This alignment causes the drive member hub keys 46 to be received within the body notches 32, and simultaneously, the drive member projections 56 will each be received within a body oblong hole 22 as shown in FIGS. 1–3. With the polymeric body 12 and the drive member 14 preliminarily assembled as shown in FIGS. 1–3, the assembly is placed upon the shaft structure 64 shown in dotted lines in FIG. 4. The shaft structure 64 will include a cylindrical stub end 65 which will be closely received within the hub 44 and the body side 18 will rest upon the shaft structure radial shoulder 66. Thereupon, bolts 68, FIG. 4, are placed within the drive member fastener holes 48 which are in alignment with the body fastener holes 34 and the bolts 68 are threaded into threaded holes, not shown, defined in the end shoulder 66. Tightening of the bolts 68 forces the drive member 14 against the body side 16 producing a frictional relationship thereto, and simultaneously, the body side 18 will be firmly seated on the shaft structure end shoulder 66.

The aforedescribed assembled sprocket permits the economical quiet operation of a polymeric chain sprocket to be utilized in a torque transfer transmission capable of transferring relatively high torque without the usual failures that occur if such a polymeric sprocket was using a central metal insert. Because the drive member engages the body 12 through the contact of projection sides 60 with the shoulders or sides 24 of the holes 22, the stresses and forces imposed against the hole sides 24 are reduced, and as the areas of contact between the projection sides 60 and the sides 24 are relatively large, concentrated stresses are eliminated. The light weight and quiet running of a polymeric sprocket are maintained, and the practice of the invention significantly reduces the likelihood of stress failures in the polymeric material.

It is appreciated that various modifications to the inventive concepts may be apparent to those skilled in the art without departing from the spirit and scope of the invention.

I claim:

1. A rotary polymeric torque transfer device adapted to be mounted on rotatable shaft structure comprising, a polymeric body having an axis of rotation, a circular periphery, first and second sides, a central opening defined in said polymeric body extending through said sides coaxial with said axis of rotation, a shoulder defined adjacent said body first side radially spaced from said axis of rotation and torque transfer elements defined on said periphery, a drive member disposed adjacent said body first side having a central portion, an inner portion and an outer portion, a hub defined on said drive member inner portion coaxially extending into said polymeric body opening to concentrically engaged with the rotational shaft structure, fastener receiving means defined on said drive member central portion for receiving a fastener to maintain said drive member in frictional engagement with said body first side, and a torque drive element defined on said drive member outer portion engaging said body shoulder to therefore transfer torque between said drive member and said polymeric body.

2. In a rotary polymeric torque transfer device as in claim 1, said drive member being formed of metal.

3. In a rotary polymeric torque transfer device as in claim 2, said drive member being formed of steel.

4. In a rotary polymeric torque transfer device as in claim 2, said polymeric body torque transfer elements comprising chain sprocket teeth.

5. In a rotary polymeric torque transfer device as in claim 2, said polymeric body torque transfer elements comprising gear teeth.

6. In a rotary polymeric torque transfer device as in claim 2, said shoulder defined adjacent said body first side comprises a hole defined in said polymeric body.

7. In a rotary polymeric torque transfer device as in claim 6, said torque drive element defined on said drive member outer portion comprising a shaped projection defined on said drive member received within said hole.

8. In a rotary polymeric torque transfer device as in claim 7, a plurality of holes defined in said polymeric body each defining a pair of shoulders, and a plurality of shaped projections defined on said drive member, each projection being received in a hole.

9. In a rotary polymeric torque transfer device as in claim 8, said drive member outer portion comprising a plurality of radially extending arms each having an end, a U-shaped projection defined upon said end of each arm, each of said shaped projections including a bent U-shaped portion homogeneously formed of the metal of the associated arm and closely received within the associated polymeric body hole.

10. In a rotary polymeric torque transfer device as in claim 9, said U-shaped projections each including spaced parallel legs having flat outer surfaces, said holes defined in said body each including linear flat spaced parallel surfaces defining said shoulders, said legs' flat outer surfaces being in opposed engageable relation to a hole linear flat surface where force transferred between said drive member and polymeric body is through engagement of said flat surfaces to reduce contact area pressures.

11. In a rotary polymeric torque transfer device as in claim 1, said polymeric body opening including at least one radial notch, said hub defined on said drive member inner portion including a key received within said notch to angularly relate said drive member to said body.

12. In a rotary polymeric torque transfer device as in claim 2, wherein said fastener receiving means defined in said drive member central portion comprises a plurality of bolt receiving holes defined in said drive member central portion, and a plurality of bolt receiving holes defined in said polymeric body extending through said body first and second sides in alignment with said drive member fastener receiving holes whereby upon tightening a plurality of bolts extending through the said drive member and body fastener receiving holes into the rotatable shaft structure upon which the torque transfer device is mounted, said body second side will be drawn into frictional engagement with the shaft structure and said drive member into engagement with said body first side.

* * * * *